United States Patent [19]
Cherkasova et al.

[11] Patent Number: 6,154,769
[45] Date of Patent: Nov. 28, 2000

[54] SCHEDULING SERVER REQUESTS TO DECREASE RESPONSE TIME AND INCREASE SERVER THROUGHPUT

[75] Inventors: Ludmila Cherkasova, Sunnyvale; Tomas Gerhard Rokicki, Palo Alto, both of Calif.

[73] Assignee: Hewlett-Packard Company, Palo Alto, Calif.

[21] Appl. No.: 09/049,688

[22] Filed: Mar. 27, 1998

[51] Int. Cl.[7] ................................................. G06F 13/14
[52] U.S. Cl. ................................................. 709/207; 709/228
[58] Field of Search ................................. 395/287, 650, 395/496, 292, 800, 705, 732, 874; 370/94.2, 429; 379/216, 207; 709/219, 217, 242, 207, 228, 232, 103; 364/514; 340/825.08; 705/1; 710/112

[56] References Cited

U.S. PATENT DOCUMENTS

| | | | |
|---|---|---|---|
| 4,139,739 | 2/1979 | Von Meister et al. | 379/297 |
| 5,392,223 | 2/1995 | Caci | 364/514 |
| 5,400,339 | 3/1995 | Sekine et al. | 370/94.2 |
| 5,428,789 | 6/1995 | Waldron, III | 709/103 |
| 5,487,170 | 1/1996 | Bass et al. | 395/732 |
| 5,511,214 | 4/1996 | Yamada | 395/800 |
| 5,517,643 | 5/1996 | Davy | 395/650 |
| 5,528,513 | 6/1996 | Vaitzblit et al. | 364/514 |
| 5,581,734 | 12/1996 | DiBrino et al. | 395/496 |
| 5,673,031 | 9/1997 | Meier | 340/825.08 |
| 5,790,862 | 8/1998 | Tanaka et al. | 395/705 |
| 5,802,161 | 9/1998 | Svoronos et al. | 379/216 |
| 5,805,824 | 9/1998 | Kappe | 709/242 |
| 5,815,662 | 9/1998 | Ong | 709/217 |
| 5,832,522 | 11/1998 | Blickenstaff et al. | 707/204 |
| 5,862,353 | 1/1999 | Revilla et al. | 395/287 |
| 5,872,938 | 2/1999 | Williams | 710/112 |
| 5,892,915 | 4/1999 | Duso et al. | 709/219 |
| 5,893,903 | 4/1999 | Eisdorfer et al. | 705/1 |
| 5,905,730 | 5/1999 | Yang et al. | 370/429 |
| 5,946,498 | 8/1999 | Chiang et al. | 395/874 |
| 5,978,843 | 11/1999 | Wu et al. | 709/219 |
| 5,987,621 | 11/1999 | Duso et al. | 714/4 |
| 5,991,812 | 11/1999 | Srinivasan | 709/232 |
| 6,035,321 | 3/2000 | Mays | 709/103 |
| 6,047,326 | 4/2000 | Kilkki | 709/228 |
| 6,055,564 | 4/2000 | Phaal | 709/207 |
| 6,067,557 | 5/2000 | Hegde | 709/103 |

*Primary Examiner*—Le Hien Luu
*Assistant Examiner*—Thong Vu

[57] ABSTRACT

A method for operating a server on a computer network to supply data stored on the server in response to requests received on the network. The server stores the requests in a queue and determines a priority value for the request. The priority value includes the sum of a counter value and a cost value, the cost value being monotonically related to the quantity of server resources needed to service the request. When the server selects one of the requests stored in the queue for servicing it picks the request having the lowest priority value of the requests stored in the queue. The selected request is removed from the queue and the counter value is incremented by a value proportional to the cost value associated with the request selected for servicing. In one embodiment, the cost value is proportional to the length of a file specified in the received request. In one embodiment, one of the received requests also includes information specifying a class for the request. The server also determines a maximum priority value for that class, the maximum priority value being at least as great as the priority value having the highest value for any request of that class currently stored in the queue. The server compares the determined priority value for the received request with the maximum priority value and changes the determined priority value to a value greater than the maximum value if the determined priority value was less than or equal to the maximum priority value.

7 Claims, No Drawings

SCHEDULING SERVER REQUESTS TO DECREASE RESPONSE TIME AND INCREASE SERVER THROUGHPUT

FIELD OF THE INVENTION

The present invention relates to computer networks, and more particularly, to an improved method for scheduling requests at a server on a computer network.

BACKGROUND OF THE INVENTION

The World Wide Web ("Web") has become a very successful means of communication between central sites connected to the Internet and individual users on the Internet who wish to communicate with the site. The communications are controlled by two programs, a Web Browser that runs on the user's computer and a Web server that runs on the site's computer. A Web Browser sends a request to a Web server using the HTTP protocol. A request results in a MIME ("Multipurpose Internet Mail Extensions"—see IETF RFC1341, 1342, 1521) Stream being sent back to the Web Browser. This protocol for communications has become the dominant method for transferring data over wide area networks.

A very popular Web Server can quickly become overloaded. The performance of a server is determined by the processing power of the computer and the network bandwidth available to the server. Sooner or later one of these factors results in requests backing up in a queue waiting to be serviced. Normally, the requests are serviced in a simple first-in, first-out (FIFO) order.

Unfortunately, with FIFO ordering, large jobs can occupy various server resources for long periods of time, delaying short jobs. A limited number of short jobs, on the other hand, will not significantly delay long jobs, since they have much shorter service times.

In a scheduling system based on the amount of system resources needed to fill each request, the smaller jobs would be inserted ahead of the larger job. Unfortunately, a resource based scheduling system of this type can easily "starve" a large job, since the large job can be pre-empted for an indefinite period of time if additional small jobs arrive before it is started.

The above described simple scheduling algorithms do not take into account other scheduling problems. For example, in some network protocols, a block of requests are received by the server and must be serviced in order. In such systems, the server is free to interleave other jobs in the sequence of requests. The above simple scheduling algorithms do not provide an effective method for handling this type of "ordered" request.

Broadly, it is the object of the present invention to provide an improved scheduling method for use by network servers.

It is a further object of the present invention to provide a scheduling method that allows the server to provide a scheduling priority that takes into account both the time of arrival of a request and the system resources needed to fill that request.

It is yet another object of the present invention to provide a scheduling method that allows ordered requests to be processed with non-ordered requests.

These and other objects of the present invention will become apparent to those skilled in the art from the following detailed description of the invention and the accompanying drawings.

SUMMARY OF THE INVENTION

The present invention is a method for operating a server on a computer network to supply data stored or computed on the server in response to requests received on the network. In the method of the present invention, the server receives a request on the network, which is stored in a queue. The server determines a priority value for the request. The priority value includes the sum of a counter value and a cost value, the cost value being monotonically related to the quantity of server resources needed to service the request. When the server selects one of the requests stored in the queue for servicing it picks the request having the lowest priority value of the requests stored in the queue. The selected request is removed from the queue and the counter value is incremented by a value proportional to the cost value associated with the request selected for servicing. In one embodiment of the present invention, the cost value is proportional to the length of a file specified in the received request. In one embodiment of the invention, one of the received requests also includes information specifying a class for the request. In this embodiment, the server also determines a maximum priority value for that class, the maximum priority value being at least as great as the priority value having the highest value for any request of that class currently stored in the queue. The server compares the determined priority value for the received request with the maximum priority value and changes the determined priority value to a value greater than the maximum value if the determined priority value was less than or equal to the maximum priority value. This assures that all requests of that class are processed in the order received.

DETAILED DESCRIPTION OF THE PREFERRED EMBODIMENTS OF THE INVENTION

While the present invention will be explained with reference to file servers of the type utilized on the Internet, it will be obvious to those skilled in the art from the following discussion that the present invention may be applied to any server on any form of network. A server is a processor connected to a network that receives requests for information stored on a storage device attached to the processor. The simplest form of request specifies a specific file on the storage device that is to be returned to the requester. This type of request requires the processor to transfer the file from the storage device to memory and then to an interface that sends the information over the network. The system resources needed to fill such a request are proportional to the size of the file transferred. This is the dominant type of file request encountered on the World Wide Web.

More complex requests require the processor to perform various computations to determine which files are to be sent. In some cases, the processor must create the final file that is to be sent in response to the request from information stored on the storage device. In servicing this type of request, the system resources that will be utilized are not easily determined with any high degree of accuracy in advance.

In general, there will be time periods in which the server receives more requests than it has resources to fill. During such periods, the requests are stored in a queue. When resources become available, a request is selected from the queue for servicing. The present invention provides a method for determining which request should be serviced next. The present invention selects the next request based both on the time of arrival of the request at the server and the resources needed to fill the request. As will be discussed in more detail below, requests may be divided into classes that receive expedited servicing.

In the simplest embodiment of the present invention, the server receives job requests which are placed in a single queue for servicing. A priority value is associated with each request. The priority value, in effect, determines the position at which the request is inserted in the queue. Alternatively, the priority values of all requests currently stored on the server may be examined to determine the next request to be serviced. In this case, no formal queue is needed. The priority value depends on the time at which the request arrives relative to other requests in the queue and the amount of resources needed to fill the request. The resources need to fill the request are measured by determining a "cost function" for the request. Any measure of the "cost" of filling the request may be utilized provided the cost function is monotonic, i.e., if request x requires fewer resources than request y, than cost(x)<cost(y). In the case of a simple file request, the preferred cost function is the length of the file requested. Alternatively, the cost function could be related to the number of CPU cycles needed for the processor to service the request.

Request $r_i$ is inserted into the priority queue with a priority values of $$c+a^*\text{cost}(r_d)$$

where c is a running queue "clock" that starts at zero and increments for each serviced request $r_i$ by the cost ($r_i$). Requests with the lowest priority values are processed first. The tuning parameter a controls the balance between the time of arrival of the request and the latency minimization. This parameter can have any non-negative value. When a=0, the method of the present invention provides the same results as a FIFO algorithm. When a is large, the present invention behaves like a system based solely on the resources needed to service a request.

If a>0, then the scheduling method of the present invention will not allow any single request to be delayed indefinitely by the other requests. This is because c increases with each request serviced. Eventually c will become greater than the priority value of any given request in the queue, and hence, all requests from that point forward will go behind that request. Accordingly, that request will not be delayed by any further incoming requests after c reaches this value.

It will be apparent that the value of c must be remain bounded. This can be accomplished by either resetting it to zero whenever the message queue empties, or by performing a scan through the priority queue and decreasing all the priorities and c by the priority value of the head request on those rare occasions when the clock is about to exceed some maximum.

As noted above, there are systems in which blocks of requests are received at once and in which these requests must be filled in order. The embodiment of the present invention discussed above can be modified to provide this feature while still optimizing the overall latency time for all of the jobs received by the server. For the purposes of this discussion, it will be assumed that the different jobs are divided into classes $J_k(k=1,\ldots,K)$, and jobs from the same class must be executed in the order in which the jobs arrive at the server. In this case, the reordering of jobs from the order in which the jobs were received can be done only between the requests belonging to different classes, since the requests within the same class must be processed in the same order that they arrive.

In this embodiment of the present invention, the requests are still stored in the general priority queue as before. An incoming request is initially assigned a priority value as described above. This priority value is compared to the priority value assigned to the last member of that class that was entered into the queue. If the priority value is less than the last priority value assigned to a member of class, the priority value is set to the last priority value assigned to a member of the class plus 1 to assure that the new member will be executed after the last member of the class.

In the preferred embodiment of the present invention, this procedure is carried out by defining two additional parameters that are kept for each class, cur_queue_length ($J_k$) and cur_pr($J_k$). Initially, both of these parameters are set to zero. Parameter cur_queue_length ($J_k$) is equal to the current number of requests in the general priority queue belonging to the class $J_k$. If this value is zero, there is no possibility of mis-ordering of the class members. If cur_queue_length ($J_k$) is not equal to zero, i.e. here are requests from class $J_k$ in a general priority queue, then parameter cur_pr ($J_k$) is equal to the priority value that was assigned to the last job request from the class $J_k$. Otherwise, cur_pr ($J_k$) is zero.

A request, $r_i$, from the job class $J_k$ is inserted into the general priority queue with a priority value pr ($r_i$) calculated in the following manner. The value of pr ($r_i$) is initially set as described above, i.e., $$pr(r_i)=c+a^*\text{cost}(r_i) \quad (1)$$

Here, a and c are as described above. If $pr(r_i) \geq \text{cur\_pr}(J_k)$, then request $r_i$ is inserted into the general priority queue with the priority pr ($r_i$) computed above, and cur_queue length ($J_k$) and cur_pr ($J_k$) are updated accordingly, i.e., $$\text{cur\_queue length }(J_k)=\text{cur\_queue length }(J_k)+1 \quad (2)$$

and $$\text{cur\_pr}(J_k)=pr(r_i) \quad (3)$$

If $pr(r_i) < \text{cur\_pr}(J_k)$ then request $r_i$ is inserted into the general priority queue with a priority value $$pr(r_i)=\text{cur\_pr}(J_k)+1. \quad (4)$$

and cur_queue_length ($J_k$) and curr ($J_k$) are recomputed as shown above in Eqs. (2) and (3).

Once again, the request with the lowest priority value is processed first. Whenever a request $r_l$ belonging to the job class $J_k$ is serviced, the parameter c is incremented by the cost ($r_i$), and cur_queue_length ($J_k$) is decremented by 1 until it reaches zero. When cur_queue_length ($J_k$) becomes zero, cur_pr ($J_k$) is reset to zero.

The above embodiments of the present invention assume that all requests belong to job classes of the same priority. However, there are situations in which different classes of requests will have different priorities. If the $J_m$ job class has higher priority than $J_n$ job class, then job requests from class $J_m$ must be served before job requests from class $J_n$. The present invention may also be utilized in such systems. In the preferred embodiment of the present invention providing this feature, each priority class has its own queue. The above described embodiments of the present invention are utilized for scheduling jobs within a priority queue. Service starts with the highest priority queue, and it is switched to the next priority queue only when the highest priority queue becomes empty, etc. It should be noted that this is equivalent to having a single queue and splitting the range of priority values into disjoint sections by adding a predetermined value to each priority value which is determined by the priority of the job.

The above described embodiments of the present invention utilize a cost function that is typically just the length of the file being transferred. In the case of requests that involve a considerable amount of computation by the server, this cost function may not be adequate. For files being transferred utilizing HTML, requests that involve additional programming are often easy to recognize, since these requests are typically "cgi" scripts. If the server keeps statistics on the length of time needed to service such scripts, either in general or for specific ones of such scripts, then a more accurate cost function can be generated. With respect to the Web, the number of such scripts is usually defined by the "scripts" stored on the server. In a typical Web conversation, the user requests a page which contains specific links and scripts that send new messages to the server to be serviced. Since there are a finite number of these links, the server can generate cost functions for the more common links and scripts that do not merely involve file transfers.

The cost function associated with specific requests may also be modified at the server to provide differential servicing of the requests based on factors other than the resources needed to service a request, and hence, provide a somewhat flexible priority system. A Web site, for example, may wish to provide the home page to a new user quickly so that the user does not become frustrated and go on to another Web site. In such an embodiment, each file that can be returned is assigned a second priority value that modifies its cost function, and hence, its priority in being serviced. The second priority value is preferably stored with the information on the file length. This second priority value is added to the priority value calculated above. High priority files are given lower second priority values, and hence, are advanced in the queue.

This embodiment can be generalized such that the information needed to provide the cost function associated with each file is stored separately in a table associated with the file. Initially, the cost function is just the file length. Files that are to be given higher priority have their cost functions reduced by a factor, which depends on the priority level of the file.

The parameter, a, discussed above strikes a balance between the two possible extremes, satisfying the highest number of users in the shortest period of time and satisfying users based on the order in which their requests are received. While a is a constant in the above described embodiments, it will be obvious to those skilled in the art from the preceding discussion that a may be varied during the operation of the system. For example, a can be altered during certain time periods to vary the type of requests that receive the highest priority. This use of the second priority value discussed above is equivalent to storing a different value of a for each file.

Similarly, the constant a could be combined with the counter value. That is, priority value may be viewed as the sum of a counter value and a cost function. Each time a request is removed from the queue for servicing, the counter is incremented by an amount that is proportional to the cost function of the request removed. Here, the constant of proportionality is 1/a.

Various modifications to the present invention will become apparent to those skilled in the art from the foregoing description and accompanying drawings.

Accordingly, the present invention is to be limited solely by the scope of the following claims.

What is claimed is:

1. A method for operating a server on a computer network to supply data stored on said server in response to requests received on said network, said method comprising the steps of:

receiving a request on said network;

determining a priority value for said request, said priority value comprising the sum of a counter value and a cost value, said cost value being monotonically related to the quantity of server resources needed to service said request;

storing said request in a queue;

selecting one of said requests stored in said queue for servicing, said selected request having the lowest priority value of said requests stored in said queue; said selected request being removed from said queue;

and incrementing said counter by a value proportional to said cost value associated with said request selected for servicing.

2. The method of claim 1 wherein said cost value is proportional to the length of a file specified in said received request.

3. The method of claim 1 wherein said counter value is set to zero each time said queue is emptied.

4. The method of claim 1 wherein one of said received requests also includes information specifying a class for said request and wherein said method further comprises the steps of:

determining a maximum priority value for that class, said maximum priority value being at least as great as said priority value having the highest value for any request of that class currently stored in said queue; and comparing said determined priority value for said received request with said maximum priority value and changing said determined priority value to a value greater than said maximum value if said determined priority value was less than or equal to said maximum priority value.

5. The method of claim 1 wherein said requests include a priority indicator and wherein a separate queue is maintained for each possible value of said priority indicator, said request being stored in said queue corresponding to said priority indicator received with said request, said next request to be serviced being selected from said queue storing requests having the highest priority as indicated by said priority indicator.

6. The method of claim 1 wherein information specifying the cost value for each possible file on said server that can be returned in response to a request is stored in a table on said server.

7. The method of claim 6 further comprising the step of providing a program that allows a user of said server to alter said information specifying said cost value.

* * * * *